United States Patent

Bauman et al.

[15] 3,705,358

[45] Dec. 5, 1972

[54] DIGITAL PRF FILTER

[72] Inventors: Weldon W. Bauman, Sunnyvale; Edward Collins, IV, San Jose, both of Calif.

[73] Assignee: Itek Corporation, Lexington, Mass.

[22] Filed: Aug. 9, 1971

[21] Appl. No.: 171,817

[52] U.S. Cl. ....................328/110, 307/232, 307/234

[51] Int. Cl. ....................H03k 5/18

[58] Field of Search......328/109, 110, 112, 138, 140; 307/232–234

[56] References Cited

UNITED STATES PATENTS

| | | | |
|---|---|---|---|
| 3,039,059 | 6/1962 | Fisher | 328/109 X |
| 3,351,939 | 11/1967 | Olsen et al. | 328/110 X |
| 3,418,586 | 12/1968 | Asher | 328/109 X |
| 3,518,555 | 6/1970 | Konotchick, Jr. | 307/232 X |

*Primary Examiner*—John Zazworsky
*Attorney*—Homer O. Blair et al.

[57] ABSTRACT

A pulse repetition frequency (PRF) filter circuit for selectively passing pulse trains over a wide bandwidth. The filter circuit utilizes the pulse repetition interval (PRI) between the first and second pulses in a pulse train to gate the third pulse with a gating signal which anticipates the third pulse at the PRI of the first and second pulses. A first pulse from an input pulse train is delayed respectively by first and second fixed delay lines, and then triggers a circuit to develop a first sawtooth wave pattern over a time period 2T. A second pulse from the input pulse train is delayed by only the first delay line, and then triggers a circuit to develop a second sawtooth wave pattern over a time period of T. The second sawtooth wave pattern has a slope twice the slope of the first sawtooth wave pattern. The relationship between the first and second sawtooth wave patterns is such that the point when the amplitudes of both patterns are equal defines the PRI of the pulse train as indicated by the first and second pulses. A comparator circuit compares the amplitudes of the first and second sawtooth wave patterns, and when the amplitudes are equal develops a gating signal which anticipates a third and undelayed pulse at the PRI of the pulse train as indicated by the first and second pulses. The PRF filter circuit filters pulse trains on a random, first-come, first-served basis, and the circuit is time-shared equally among incoming pulse trains within the bandwidth of the circuit.

11 Claims, 6 Drawing Figures

PATENTED DEC 5 1972 3,705,358

SHEET 1 OF 2

Weldon W. Bauman
Edward Collins, IV
INVENTORS.
BY
William C. Roch
ATTORNEY

Weldon W. Bauman
Edward Collins, IV
INVENTORS.
BY William C. Roch
ATTORNEY.

DIGITAL PRF FILTER

BACKGROUND OF THE INVENTION

The present invention relates generally to filter circuits for filtering pulse trains having PRFs within a given bandwidth, and more particularly pertains to a new and improved PRF filter circuit which is capable of filtering pulse trains over a wide bandwidth, and which increases its selectivity by utilizing the PRI of each pulse train to selectively gate pulses through the filter circuit.

In the field of PRF filter circuits, it has been the general practice to utilize a circuit which develops a wide, fixed window gating signal a given amount of time after the receipt of a first pulse. The window gating signal determines the bandwidth of the filter circuit, and gates all pulses received within the window gating signal. A disadvantage of such a circuit is that many extraneous pulses are passed through the wide window gating signal. The passes extraneous pulses present an unsatisfactory level of pulse noise at the output of the filter circuit.

SUMMARY OF THE INVENTION

In accordance with a preferred embodiment, a PRF filter circuit is disclosed which is capable of filtering pulse trains over a relatively wide bandwidth, and which utilizes the PRI of each pulse train to selectively gate pulses through the filter circuit. Further, the preferred embodiment provides a PRF filter circuit wherein the PRI of the first two pulses in a pulse train is utilized to gate the third pulse through the filter circuit. The PRI of the first two pulses may vary over the bandwidth of the filter circuit, but after the first two pulses establish the PRI of the pulse train, the third pulse must be received within a narrow gating window of the established PRI to be gated through the filter circuit. Also, the preferred embodiment allows filtering of pulse trains on a random, first-come, first-served basis, which allows one filter circuit to filter numerous pulse trains, with the output of the filter circuit being time shared equally among the pulse trains.

Further, the preferred embodiment provides a system for precisely measuring the interval between two input signals. Although the preferred embodiment is described in context with a PRF filter circuit, the teachings of this invention on precision measurements of the interval between two input signals have wide applicability beyond the PRF filter art.

DESCRIPTION OF A PREFERRED EMBODIMENT

Figure 1:
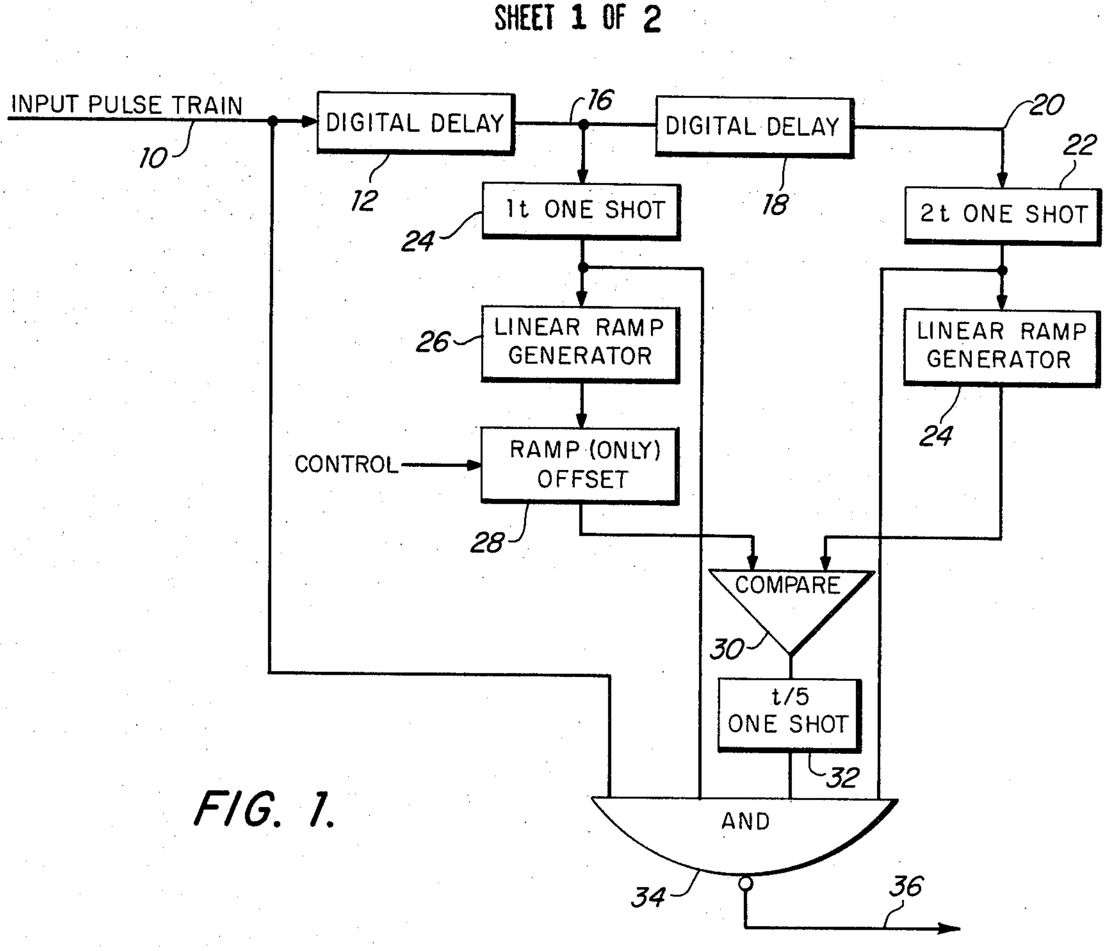
FIG. 1 illustrates a block diagram of one embodiment of a filter circuit.
Figure 2:
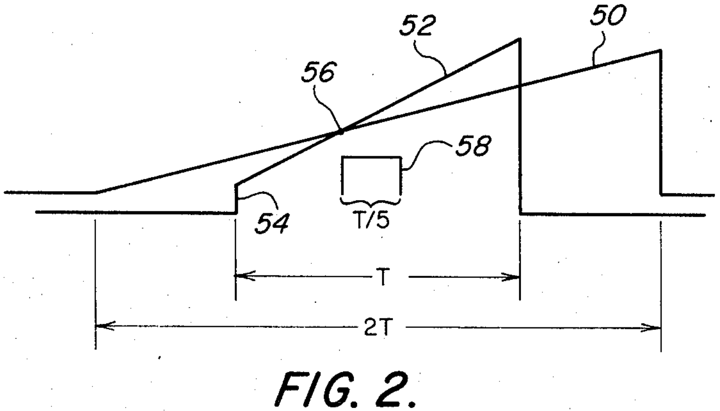
FIG. 2 illustrates several waveforms developed by the circuit of FIG. 1.

FIG. 1 illustrates a block diagram of one embodiment of a filter circuit. A pulse train on line 10 provides an input for the circuit. The pulse train may be a composite pulse train comprised of many component pulse trains, each having a given PRF. The filter circuit will pass all component pulse trains having a PRF within the bandwidth of the filter circuit. Assume for the purpose of explanation that a single pulse train, which lies within the bandwidth of the filter circuit, is an input on line 10. The first pulse in the pulse train is shifted by a fixed delay line 12, which may be a digital delay line consisting of a plurality of flip-flop circuits driven by a clock generator, to point 16 in the circuit. The first pulse is then further delayed by delay line 18, which may be the same type of circuit as delay line 12, before arriving at point 20 in the circuit. Delay lines 12 and 18 each delay the pulse by a period of time equal to the pulse repetition time (PRT) of pulse trains which are desired to be passed by the filter circuit. By the time the first pulse has passed through the first and second delay lines to point 20, a second pulse in the pulse train has been shifted by the first delay line 12 to point 116, and a third pulse is about to enter the circuit on input line 10. The first pulse, upon reaching point 20 in the circuit, triggers a one shot circuit 22, the output of which may be a constant current source, for a length of time 2T. The output of one shot circuit 22 drives a linear ramp generator, which may simply be a capacitor, to develop a sawtooth wave pattern over the time period 2T. The developed sawtooth wave pattern is considered to consist of a series of electrical signals, the amplitudes of which gradually increase in time. Such a sawtooth wave pattern is illustrated in FIG. 2 as waveform 50. The second pulse, upon reaching point 16 in the circuit, triggers one shot circuit 24, the output of which may be a constant current source, to develop an output signal for a length of time T. The output of one shot circuit 24 drives linear ram generator 26, which may be simply a capacitor, to develop a sawtooth wave pattern over the time period T. This sawtooth wave pattern is also considered to consist of a series of electrical signals, the amplitudes of which gradually increase in time. The sawtooth wave pattern generated by ramp generator 26 has a slope twice as great as the sawtooth wave pattern developed by ramp generator 24. Such a sawtooth wave pattern is illustrated in FIG. 2 as waveform 52. A ramp offset circuit 28 increases the amplitude of waveform 52 by an amount 54 for a reason which will be explained later. The ramp offset circuit may be simply a resistor in series with the capacitor, with the voltage of waveform 52 being taken across both the capacitor and the resistor. A comparator circuit 30 compares the amplitudes of waveforms 50 and 52, and generates an output signal when the amplitude of waveform 52 is equal to or greater than the amplitude of waveform 50, which occurs at point 56. Point 56 is indicative of the PRI of the pulse train as demonstrated by the first and second pulses. The output signal of comparator 50 triggers a one shot circuit 32 which develops output signal 58, illustrated in FIG. 2, for a period of time T/5. AND gate 34 produces an output pulse on line 36 if the third pulse in the component pulse train arrives on input line 10 while all three one shot generators 22, 24 and 32 are producing output signals. Thus AND gate 34 produces an output pulse if a third pulse is received on input line 10 within the window gating signal 58 which is generated at a point in time when a third pulse is anticipated to be received in accordance with the PRI of the pulse train as indicated by the first and second pulses in the pulse train. The ramp generators 24 and 26 are designed so that the base line voltage from which waveform 52 is generated is slightly below the base line voltage from which waveform 56 is generated. This difference in base line voltages is provided to prevent noise in the circuit signals from accidentally triggering comparator circuit 30. Offset circuit 28 is provided to increase the amplitude of waveform 52 at the beginning of the sawtooth wave pattern so that crossover of the two waveforms at point 56 occurs slightly before the third pulse is anticipated. The offset circuit results in the gating window 58 being centered about a point in time when the third pulse is anticipated. If offset circuit 28 were not provided, the third pulse in the pulse train would arrive at the leading edge of gating signal 58, and the slightest amount of jitter in the pulse train or any slight retardation or advancement of the pulses in the digital delay lines 12 and 18 might cause the third pulse to be received outside of gating window 58.

Figures 3A, 3B, 3C, 3D:
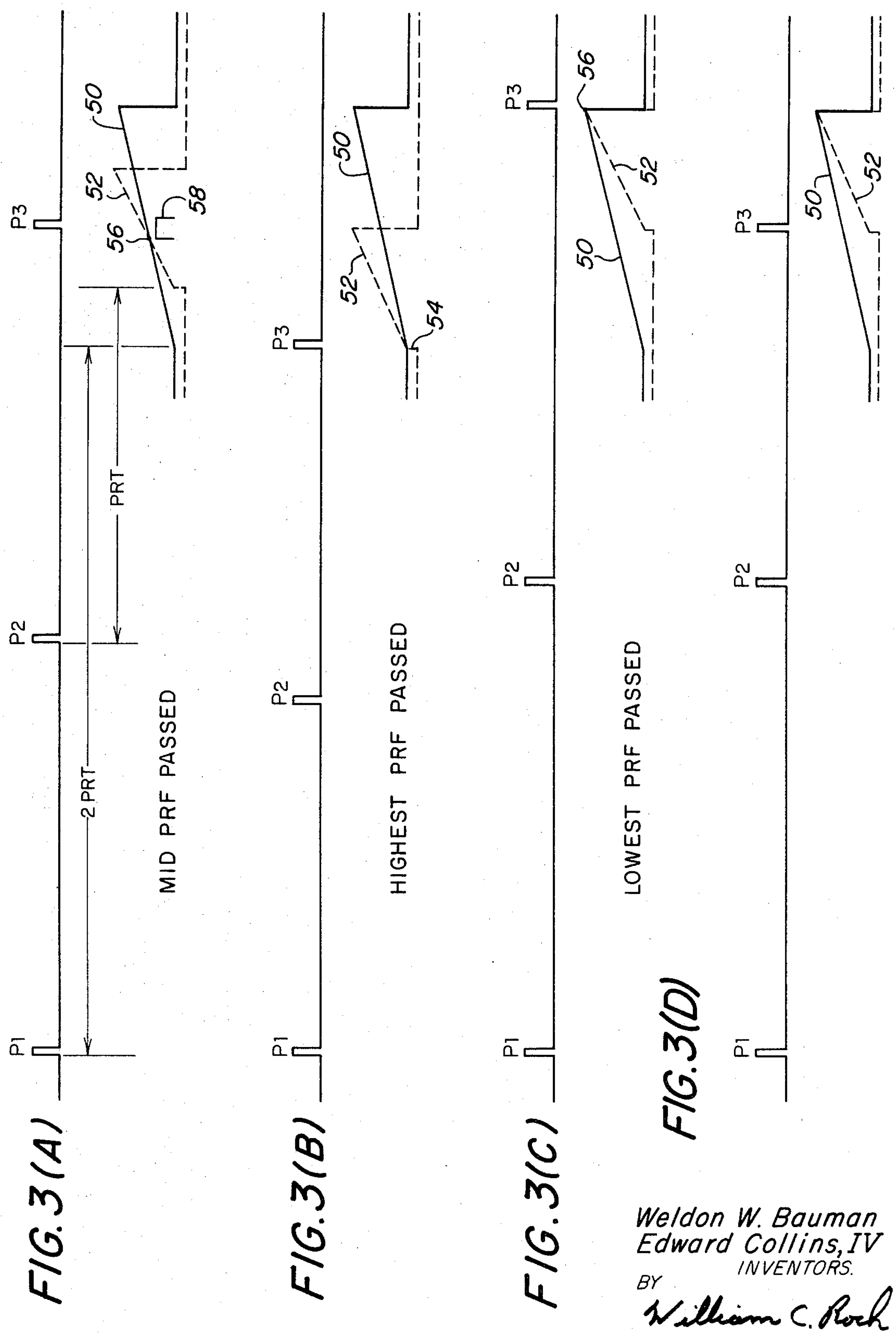
FIGS. 3A–3D illustrate several exemplary pulse trains, and the reaction of the filter circuit to each pulse train.

FIG. 3(A) illustrates a first pulse train, consisting of pulses P1, P2 and P3, having a PRF exactly in the middle of the bandwidth of the filter circuit, which is determined by the width T of one shot circuit 24. The first pulse P1, after traveling through the two delay lines and being delayed for a period of time 2PRT, causes the generation of waveform 50. The second pulse P2, after being delayed by only the first delay line for a period of time PRT causes the generation of waveform 52. When the amplitude of waveform 52 catches up to the amplitude of waveform 50 at point 56 the gating signal 58 is developed. In this example the third pulse P3 is gated since it arrives in the middle of gating signal 58.

FIG. 3(B) illustrates a pulse train having the highest PRF within the bandwidth of the filter circuit. Pulse P1 causes the generation of waveform 50. Pulse P2 causes the generation of waveform 52. The offset 54 of waveform 52 is immediately greater than waveform 50, and gating signal 58 is immediately developed, causing the passage of pulse P3.

FIG. 3(C) illustrates a pulse train having the lowest PRF within the bandwidth of the filter circuit. Pulse P1 causes the generation of sawtooth waveform 50. Pulse P2 causes the generation of sawtooth waveform 52. Waveform 52 catches up with waveform 50 at point 56, and causes the generation of gating pulse 58 which gates pulse P3.

FIG. 3(D) illustrates incoming pulse P1, P2 and P3 wherein there is a change in the PRI between pulses P1 and P2, and pulses P2 and P3. The timing of the pulses is such that waveform 52 catches up with waveform 50 at point 56, and gating signal 58 is developed. Pulse P3 has arrived earlier than the generation of the gating signal, and therefore pulse P3 is not gated by the filter circuit. It should be noted that the filter circuit would ordinarily pass a pulse train having a PRI as between pulses P1 and P2, as illustrated in FIG. 3(C), and would normally pass a pulse train having a PRI as between pulses P2 and P3, as illustrated in FIG. 3(B), but the change in the PRI between P1 and P2, and P2 and P3 is sufficiently great such that pulse P3 is not gated by the filter circuit.

In another embodiment, additional ramp, comparator and gating circuits could be utilized in conjunction with the disclosed basic PRF filter circuit to detect or reject pulse trains which are harmonically related to the fundamental pulse train desired to be detected by the basic PRF filter circuit.

In further embodiments digital circuitry might be substituted for the disclosed analog circuitry. First and second clocked counters, with the first counter being clocked at twice the rate of the second counter, might be substituted for the ramp function generators, and count coincidence of the two counters would be detected instead of ramp crossover. In still another embodiment two shift registers of equal length, with the 2T register being clocked at one-half the rate of the 1T register, might be substituted for the ramp generators, and bit coincidence of the two registers would be detected instead of ramp crossover.

Also, while the illustrated embodiment generates waveforms having times of T, 2T and T/5, other time relationships could be utilized in alternative embodiments. While several embodiments have been described, the teachings of this invention will suggest many other embodiments to those skilled in the art.

We claim:

1. A system for producing an indication of the timing interval between first and second input pulses in a pulse train and for utilizing the indicated timing interval to gate a third pulse in the pulse train and comprising:

a. an input means for receiving input pulses;

b. first timing means for generating a first set of electrical signals having a value which changes at a first predetermined rate;

c. second timing means for generating a second set of electrical signals having a value which changes at a second predetermined rate greater than said first predetermined rate;

d. first actuation means for causing said first timing means to commence generating said first set of electrical signals upon the receipt of the first input pulse by the first actuation means;

e. second actuation means for causing said second timing means to commence generating said second set of electrical signals upon the receipt of the second input pulse by the second actuation means;

f. comparator means coupled to said first and second timing means for producing an output signal upon the occurrence of a predetermined relationship between said values associated with said first and second sets of electrical signals, said output signal being indicative of the timing interval between said first and second input signals;

g. means, including said comparator means, for developing a gating signal for a third pulse in the pulse train at the timing interval, as indicated by the output signal of said comparator means, after the receipt by said input means of the second input pulse; and h. means for gating the third pulse if it arrives in coincidence with said developed gating signal.

2. Apparatus as set forth in claim 1 wherein said developing means includes:

a. a first delay means, connected between said input means and said first actuation means, for delaying the first pulse for a first given period of time after receipt by said input means before directing the first pulse to said first actuation means; and b. a second delay means, connected between said input means and said second actuation means, for delaying the second pulse for a second given period of time after receipt by said input means before directing the second pulse to said second actuation means.

3. Apparatus as set forth in claim 2 wherein said means for delaying the second pulse for a second period of time includes means for delaying the second pulse for a period of time which is half as long as said first period of time.

4. Apparatus as set forth in claim 3 wherein said first delay means and said second delay means include a common delay line with said first actuation means receiving the first pulse from the end of the common delay line and said second actuation means receiving the second pulse from the middle of the common delay line.

5. Apparatus as set forth in claim 4 wherein said gating means includes an AND gate having input connections from said input means, said first timing means, said second timing means, and said means for developing a gating signal.

6. Apparatus as set forth in claim 3 wherein:

a. said first timing means includes means for developing a first ramp function having a given slope;

b. said second timing means includes means for developing a second ramp function having a slope greater than the slope of said first ramp function; and c. said comparator means includes means for detecting when the amplitude of said second ramp function has a predetermined relationship to the amplitude of said first ramp function.

7. Apparatus as set forth in claim 6 wherein said second timing means includes means for developing a ramp function having a slop twice the slope of said first ramp function.

8. Apparatus as set forth in claim 7 wherein said first delay means and said second delay means include a common delay line with said first actuation means receiving the first pulse from the end of the common delay line and said second actuation means receiving the second pulse from the middle of the common delay line.

9. Apparatus as set forth in claim 8 wherein said gating means includes an AND gate having input connections from said input means, said first timing means, said second timing means, and said means for developing a gating.

10. Apparatus as set forth in claim 1 wherein:

a. said first timing means includes means for developing a first ramp function having a given slope;

b. said second timing means includes means for developing a second ramp function having a slope greater than the slope of said first ramp function; and c. said comparator means includes means for detecting when the amplitude of said second ramp function has a predetermined relationship to the amplitude of said first ramp function.

11. Apparatus as set forth in claim 10 wherein said second timing means includes means for developing a ramp function having a slope twice the slope of said first ramp function.

* * * * *